United States Patent
Kobayashi et al.

(10) Patent No.: US 10,464,517 B2
(45) Date of Patent: Nov. 5, 2019

(54) VEHICLE OCCUPANT PROTECTION DEVICE

(71) Applicant: AUTOLIV DEVELOPMENT AB, Vargarda (SE)

(72) Inventors: Yuto Kobayashi, Yokohama (JP); Hiroyuki Taguchi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 101 days.

(21) Appl. No.: 15/740,436

(22) PCT Filed: May 20, 2016

(86) PCT No.: PCT/JP2016/065105
§ 371 (c)(1),
(2) Date: Dec. 28, 2017

(87) PCT Pub. No.: WO2017/010169
PCT Pub. Date: Jan. 19, 2017

(65) Prior Publication Data
US 2018/0186326 A1    Jul. 5, 2018

(30) Foreign Application Priority Data
Jul. 11, 2015 (JP) .................................. 2015-139273

(51) Int. Cl.
*B60R 21/207* (2006.01)
*B60R 21/233* (2006.01)
(Continued)

(52) U.S. Cl.
CPC .......... *B60R 21/207* (2013.01); *B60R 21/233* (2013.01); *B60R 21/239* (2013.01);
(Continued)

(58) Field of Classification Search
CPC ................ B60R 21/207; B60R 21/233; B60R 21/23138; B60R 2021/23332; B60R 2021/23324; B60R 2021/23146
See application file for complete search history.

(56) References Cited

U.S. PATENT DOCUMENTS

| 9,539,975 B2 | 1/2017 | Tanabe et al. |
| 2002/0063452 A1* | 5/2002 | Harada ................. B60N 2/5825 297/216.13 |

(Continued)

FOREIGN PATENT DOCUMENTS

| CA | 2976727 A1 * | 2/2018 | ........... B60R 21/207 |
| DE | 102009021635 A1 * | 11/2010 | ........... B60R 21/207 |

(Continued)

OTHER PUBLICATIONS

Tanabe et al. WO 2015/108120 Machine English Translation, ip.com. (Year: 2015).*

(Continued)

Primary Examiner — Karen Beck
(74) Attorney, Agent, or Firm — Brinks Gilson & Lione (57) ABSTRACT

A side air bag device restraining an occupant at the early stage of the deployment. A seat back has a side support part bulging in a vehicle forward direction at a side part in a vehicle width direction. A seat frame of the seat is provided inside the seat. The side air bag device has an air bag deploying to restrain an occupant and an inflator supplying inflating gas. A side frame part of the seat frame is inside the side support part, and the side air bag device is on an outer side of the side frame. The air bag has a main chamber deploying forward and to an outer side of the side support part and a sub-chamber deploying inside the side support part. The sub-chamber deploys further toward a forward side than a vehicle forward edge of the side frame, at least a front (Continued)

part of the side support part protrudes and deforms toward an occupant side.

20 Claims, 11 Drawing Sheets

(51) Int. Cl.
    *B60R 21/231*     (2011.01)
    *B60R 21/239*     (2006.01)
    *B60R 21/26*     (2011.01)

(52) U.S. Cl.
    CPC ........ *B60R 21/23138* (2013.01); *B60R 21/26* (2013.01); *B60R 2021/23146* (2013.01); *B60R 2021/23324* (2013.01)

(56) References Cited

U.S. PATENT DOCUMENTS

| | | | |
|---|---|---|---|
| 2007/0267856 A1* | 11/2007 | Schedler | B60R 21/23138 280/743.2 |
| 2010/0090448 A1* | 4/2010 | Pursche | B60R 21/0134 280/730.2 |
| 2011/0241322 A1* | 10/2011 | Nozaki | B60R 21/23138 280/730.2 |
| 2015/0076802 A1 | 3/2015 | Tanabe et al. | |
| 2015/0336528 A1* | 11/2015 | Tanabe | B60R 21/207 280/728.2 |
| 2016/0159313 A1* | 6/2016 | Fujiwara | B60R 21/233 280/729 |
| 2017/0174174 A1* | 6/2017 | Ohno | B60R 21/239 |
| 2019/0047504 A1* | 2/2019 | Sugishima | B60R 21/207 |
| 2019/0084516 A1* | 3/2019 | Fukawatase | B60R 21/207 |

FOREIGN PATENT DOCUMENTS

| | | | | |
|---|---|---|---|---|
| JP | 2009-023494 A | 2/2009 | | |
| JP | 2013-199152 A | 10/2013 | | |
| JP | 2014-080169 A | 5/2014 | | |
| JP | 6394657 B2 * | 9/2018 | ............ | B60R 21/26 |
| WO | WO 2013/141316 A1 | 9/2013 | | |

OTHER PUBLICATIONS

International Search Report of PCT/JP2016/065105 dated Aug. 9, 2016.

* cited by examiner

A1-A1 CROSS SECTION

A2-A2 CROSS SECTION

FIG. 6(B)

A2-A2 CROSS SECTION

A3-A3 CROSS SECTION

FIG. 11

VEHICLE OCCUPANT PROTECTION DEVICE

CROSS-REFERENCE TO RELATED APPLICATIONS

This application is a 35 U.S.C. § 371 national phase application of PCT International Application No. PCT/JP2016/065105, filed May 20, 2016, which claims the benefit of priority under 35 U.S.C. § 119 to Japanese Patent Application No. 2015-139273, filed Jul. 11, 2015, the contents of which are incorporated herein by reference in their entirety.

FIELD OF THE INVENTION

The present invention relates to an occupant protection device having a side air bag device.

BACKGROUND

It has been known that one or a plurality of air bags is provided in motor vehicles to protect occupants in case of the accidents of the vehicles. As air bags, there have been known various types such as so-called air bags for drivers that inflate in the vicinity of the steering wheels of automobiles to protect the drivers, side curtain air bags that deploy downward inside the windows of automobiles to protect occupants during lateral impacts on vehicles, lateral turning, or overturning accidents, and side air bags that deploy between occupants and side panels to protect the occupants during lateral impacts on vehicles. The present invention relates to a side air bag device installed in a vehicle seat and an occupant protection device having the side air bag device.

A side air bag device described in Japanese Patent Application Laid-Open No. 2009-023494 has a main air bag and a subsidiary air bag. Further, the subsidiary air bag inflates and deploys prior to the main air bag to restrain an occupant at an early stage. Other than the invention described in the above-mentioned reference, side air bag devices each having a subsidiary air bag in addition to a main air bag have been proposed. It has been strongly requested that such side air bag devices be reduced in size. Moreover, it has been that damage argument protection be provided not only by a main air bag but also by a subsidiary air bag.

SUMMARY

The present invention has been made in view of the above circumstances and has an object of providing a side air bag device capable of quickly and appropriately restraining an occupant at the early stage of the deployment of an air bag and an occupant protection device having the side air bag device.

Further, the present invention has another object of providing a side air bag device contributing to a reduction in size of a device and an occupant protection device having the side air bag device.

In order to solve the above problem, the present invention provides an occupant protection device having a vehicle seat having a seat cushion forming a seat surface and a seat back forming a back rest, and a side air bag device accommodated in the vehicle seat. The seat back has a side support part bulging in a vehicle travelling direction (vehicle forward) at a side part (end part) thereof in a vehicle width direction. A seat frame forming a framework of the seat is provided inside the vehicle seat. The side air bag device has an air bag inflating and deploying to restrain an occupant and an inflator supplying inflating gas to the air bag. A side frame part constituting a part of the seat frame is disposed inside the side support part, and the side air bag device is accommodated on an outer side of the side frame part in the vehicle width direction. The air bag has a main chamber deploying forward from the side support part and a sub-chamber deploying forward from between the main chamber and the side support part. Further, the sub-chamber deploys further toward a forward side than a vehicle forward edge of the side frame, thereby making at least a front part of the side support part protrude and deform toward an occupant side. The sub-chamber preferably deploys only inside the side support part. Further, the main chamber preferably deploys forward and to an outer side of the side support part.

According to the present invention with the above configuration, the sub-chamber deploys inside the side support part at the early stage of the operation of the air bag unit. Therefore, it becomes possible to quickly restrain the movement of an occupant to the outside in the vehicle width direction. At this time, since the sub-chamber deploys further toward the forward side than the vehicle forward edge of the side frame and at least the front part of the side support part protrudes and deforms toward the occupant side, the occupant is pushed toward an inside in the vehicle width direction. Thus, the generation of a force by which the occupant is pushed out from his/her back to a diagonally forward direction can be prevented or minimized. As a result, it becomes possible to prevent the occupant from moving in a direction in which a seat belt is highly tensioned. That is, restraining performance can be maximized. The protrusion and the deformation of the side support part is sufficiently achieved by the sub-chamber deploying only inside the side support, and a greater amount of the gas generated by the protrusion and the deformation of the side support part can be distributed to the main chamber. Further, when the main chamber is configured to deploy forward and to the outer side of the side support part, the disturbance of the deployment of the main chamber due to the deployment of the sub-chamber is reduced. As a result, the deployment of the main chamber is smoothened, and the cooperation between the deployment of the main chamber and the deployment of the sub-chamber contributes to an improvement in the performance of protecting the occupant.

The inflator can be accommodated inside the sub-chamber. Here, the main chamber and the sub-chamber are preferably provided to be separated from each other, an internal space of the main chamber and an internal space of the sub-chamber are preferably connected together via a vent hole, and the inflating gas inside the sub-chamber preferably flows into the main chamber via the vent hole. By the employment of the above configuration, the internal structures of the chambers can be simplified.

Further, since the sub-chamber deploys prior to deployment of the main chamber, it becomes possible to quickly restrain the lateral movement of the occupant.

The main chamber and the sub-chamber can be provided to be separated from each other, an intermediate chamber can be connected between the main chamber and the sub-chamber, the inflator can be accommodated inside the intermediate chamber, a first vent hole can be formed at a boundary between the main chamber and the intermediate chamber, a second vent hole can be formed at a boundary between the sub-chamber and the intermediate chamber, and the inflating gas inside the intermediate chamber can be distributed to the sub-chamber and the main chamber via the first vent hole and the second vent hole. Here, when the second vent hole is made greater in size than the first vent hole, it becomes possible to accelerate the deployment of the sub-chamber.

When the sub-chamber is disposed on a side closer to the occupant than the main chamber, it becomes possible to prevent inconvenience in which the sub-chamber goes around the hip side (back side) of the occupant at the early stage of its deployment.

The side support part preferably has a starting-point region serving as a starting point when the side support part is bent to the occupant side by inflation of the sub-chamber. Thus, the side support part is easily bent by the deployment force of the sub-chamber of the air bag. As a result, it becomes possible to reliably restrain the movement of the occupant to the outside in the vehicle width direction immediately after the occurrence of a collision accident. Note that the starting-point region can be one of or a combination of a cut, a recessed part, and a thinned region.

The sub-chamber is preferably disposed below the side support part so that a lumbar region of the occupant is laterally pushed by the side support part when the sub-chamber deploys. Pressing the lumbar region close to the center of gravity of an occupant's body contributes to an improvement in the performance of restraining the occupant at the early stage of the occurrence of an accident.

The occupant protection device can further include a stay cloth covering at least a part of the main chamber and the sub-chamber. Further, the stay cloth preferably has a fragile part serving as a starting point to tear when the sub-chamber deploys. When the stay cloth is torn by the sub-chamber deploying only inside the side support and having a relatively small capacity and a short deployment time, the main chamber can be urged to smoothly deploy. That is, the main chamber inflates from the torn open part to be able to quickly deploy to the outer side of the side support.

The stay cloth can be constituted by a first stay cloth positioned on a vehicle outer side of the side air bag and a second stay cloth positioned on a vehicle inner side of the side air bag. Further, the occupant protection device can include a wire connecting a vehicle backward part of the first stay cloth and a vehicle backward part of the second stay cloth together.

The stay cloths themselves are used to assist to tear a seat (side support part) skin when the air bag deploys, and the wire is used to enhance the effect of assisting the tearing. A tensile force applied to the stay cloths when the air bag deploys can be increased by the wire, and the tearing the seat skin can be completed at an earlier timing during the deployment. Thus, a timing at which the occupant is moved in a lateral direction by the sub-chamber can be made earlier, and the effect of restraining the occupant during the full deployment of the main chamber can be further enhanced.

BRIEF DESCRIPTION OF THE DRAWINGS

FIGS. 7(A) and 7(B) are explanatory views showing a deployment state of the air bag unit according to the first embodiment, and FIG. 7(A) and FIG. 7(B) show the early stage and the later stage of the deployment of the air bag, respectively.

DETAILED DESCRIPTION

A description will be given, with reference to the accompanying drawings, of a vehicle seat in which a side air bag device according to the embodiments of the present invention is installed. Note that "front," "rear," "inside," and "outside" in respective figures indicate the forward (travelling direction) of a vehicle, the backward (direction opposite to the travelling direction) of the vehicle, the inside (occupant side) of the vehicle in a vehicle width direction, and the outside (door panel side) of the vehicle in the vehicle width direction, respectively.

Figure 1:
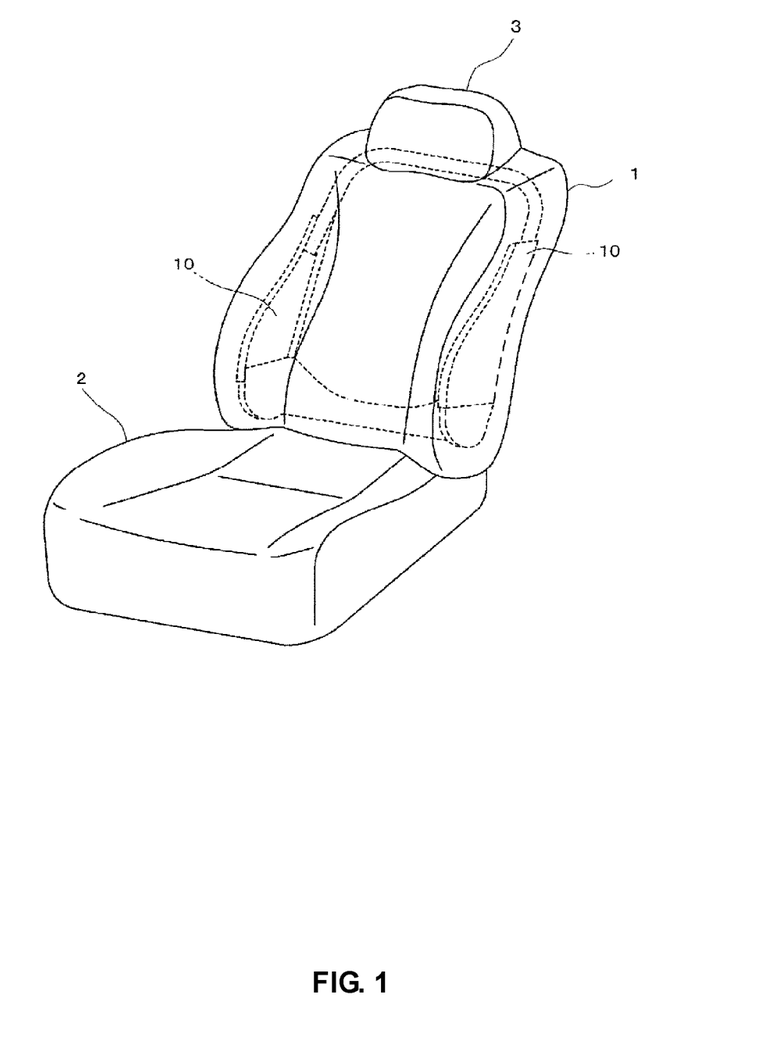
FIG. 1 is a perspective view showing mainly the external shape of a vehicle seat used for an occupant protection device according to a first embodiment of the present invention, an illustration of an air bag unit is omitted.
Figure 2:
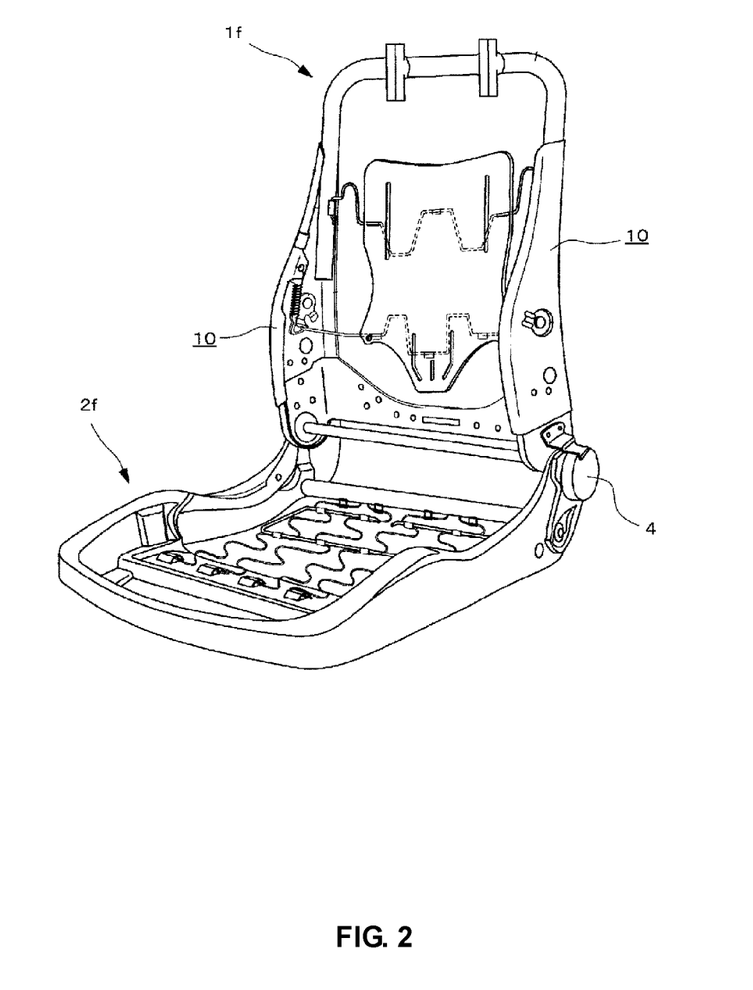
FIG. 2 is a perspective view showing the internal structure (seat frame) functioning as the framework of the vehicle seat shown in FIG. 1, and the illustration of the air bag unit is omitted.
Figure 3:
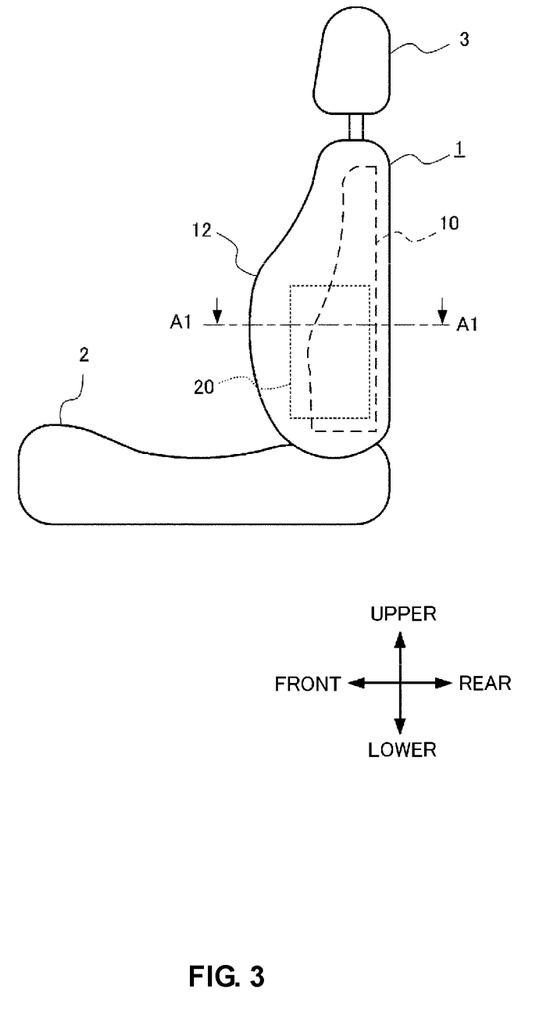
FIG. 3 is a schematic side view of the occupant protection device according to the first embodiment and shows a state where the side air bag device is accommodated observed from an outside in a vehicle width direction.
Figure 4:
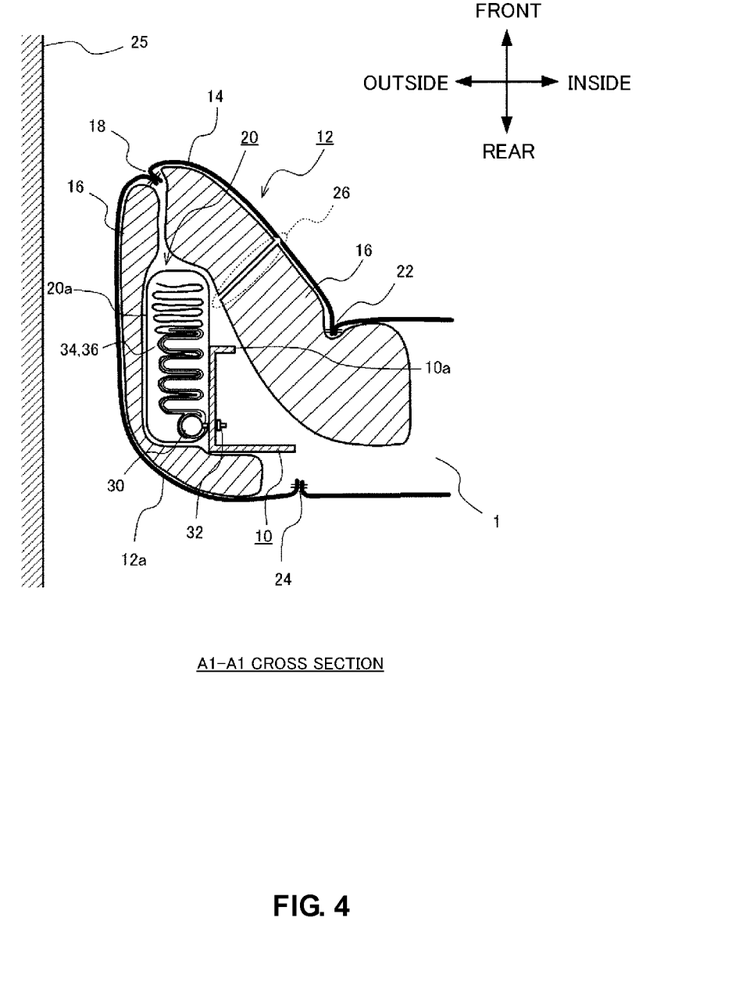
FIG. 4 is a cross-sectional view showing a part of a cross section in the A1-A1 direction of FIG. 3.
Figure 5:
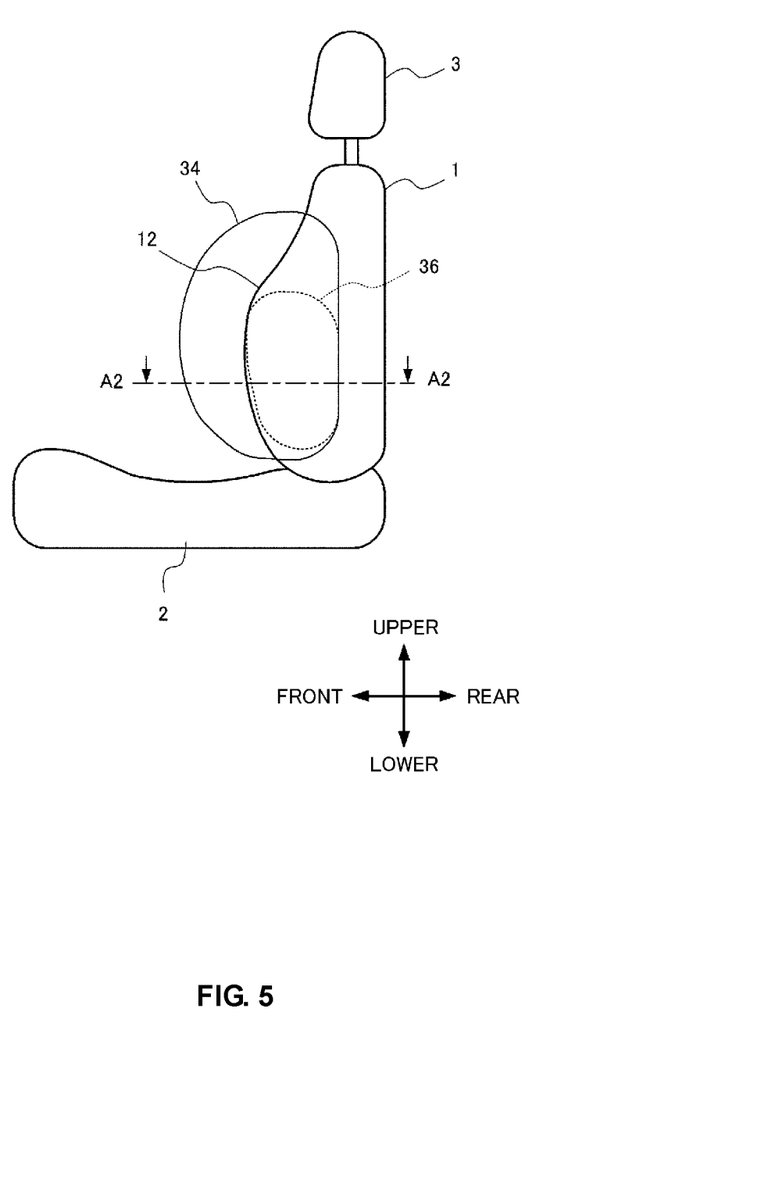
FIG. 5 is a schematic side view of the occupant protection device according to the first embodiment and shows a state where an air bag deploys observed from the outside in the vehicle width direction.
Figure 6A:
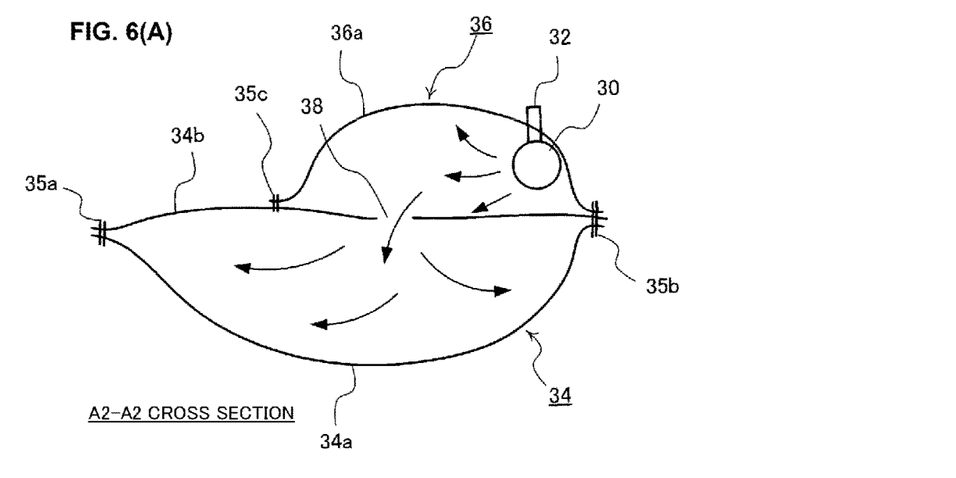
FIGS. 6(A) and 6(B) are schematic views showing a deployment state of the air bag corresponding to a cross section in the A2-A2 direction of FIG. 5, and FIG. 6(A) and FIG. 6(B) show different modes.
Figure 6B:
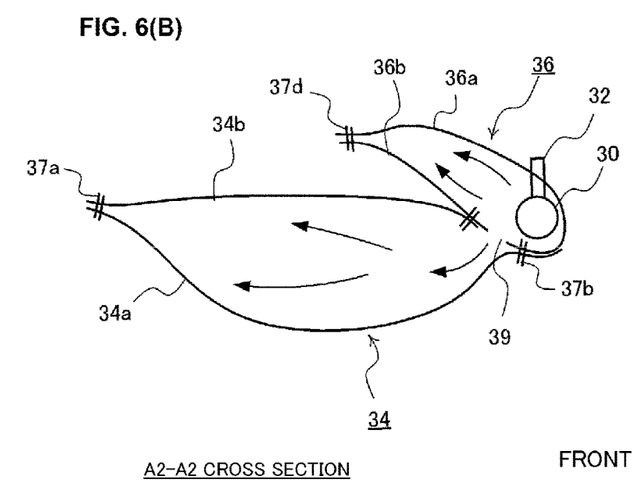
Figure 7A:
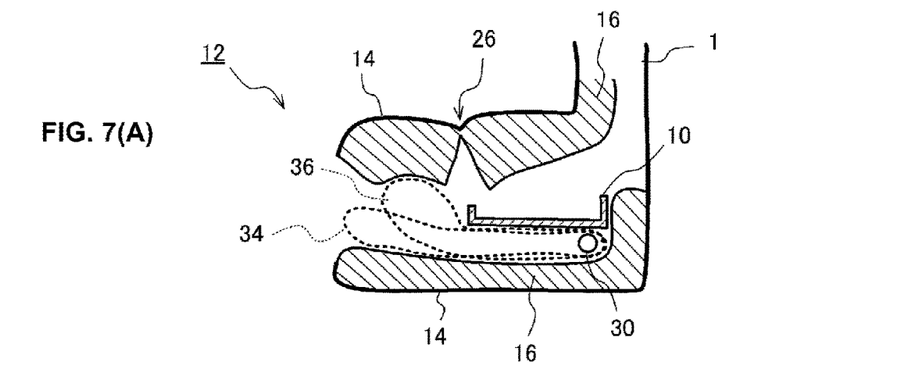
Figure 7B:
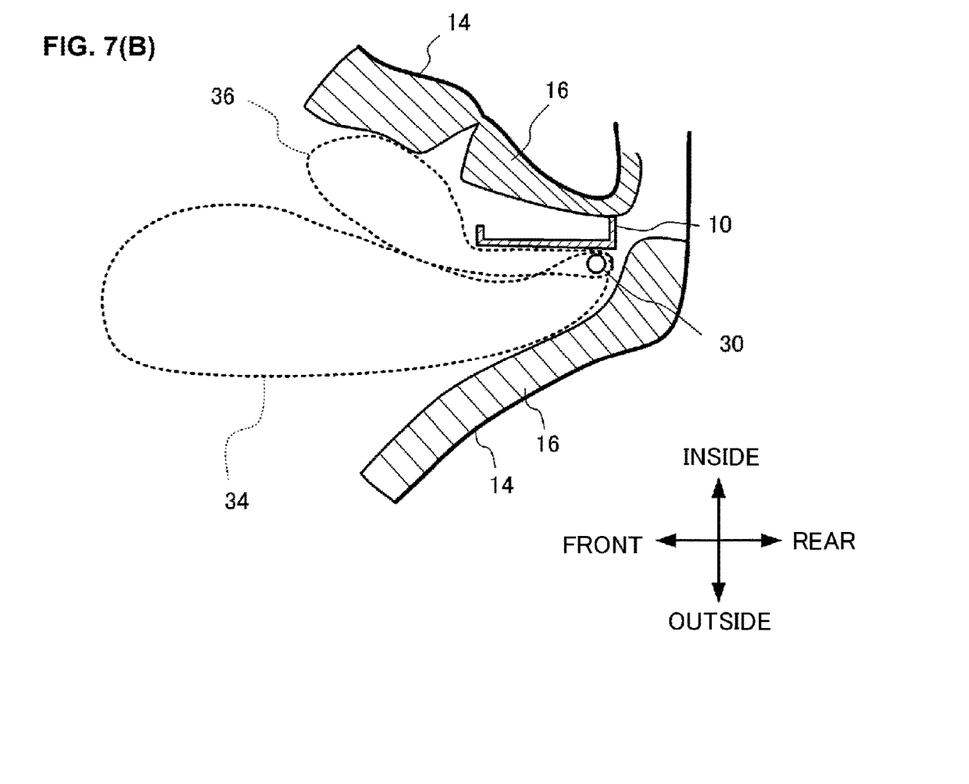

FIG. 1 is a perspective view showing mainly the external shape of a vehicle seat used for an occupant protection device according to a first embodiment of the present invention, wherein an air bag unit 20 is not shown. FIG. 2 is a perspective view showing an internal structure (seat frame) functioning as the framework of the vehicle seat shown in FIG. 1, wherein the air bag unit 20 is not shown. FIG. 3 is a schematic side view of the occupant protection device according to the first embodiment and shows a state, observed from an outside in the vehicle width direction, where the air bag unit 20 is accommodated in the side surface (near side) of the vehicle seat close to a door. FIG. 4 is a cross-sectional view showing a part of a cross section in the A1-A1 direction of FIG. 3. FIG. 5 is a schematic side view of the occupant protection device according to the first embodiment and shows a state where an air bag deploys observed from the outside in the vehicle width direction. FIG. 6 is a schematic view showing a deployment state of the air bag corresponding to a cross section in the A2-A2 direction of FIG. 5, FIG. 6(A) and FIG. 6(B) showing different modes. FIG. 7 is an explanatory view showing a deployment state of the air bag unit according to the first embodiment, FIG. 7(A) and FIG. 7(B) showing the early stage and the later stage of the deployment of the air bag unit, respectively.

The present invention provides an occupant protection device having a vehicle seat and a side air bag device 20 accommodated in the vehicle seat. As shown in FIG. 1 and FIG. 2, the vehicle seat according to the embodiment is constituted by a seat cushion 2 at its part on which an occupant sits, a seat back 1 forming a back rest, and a head rest 3 connected to the upper end of the seat back 1 in terms of components.

A seat back frame 1f forming the framework of the seat is provided inside the seat back 1. Pads made of a urethane foam material or the like are provided on the surface and on the periphery of the seat back frame 1f. The surface of each of the pads is covered with a skin such as leather and fabric. A seat frame 2f is disposed on the bottom side of the seat cushion 2. Pads made of a urethane foaming material or the like are provided on the upper surface and on the periphery of the seat frame 2f. The surface of each of the pads is covered with the skin such as leather and fabric. The seat frame 2f and the seat back frame 1f are connected together via a reclining mechanism 4.

As shown in FIG. 2, the seat back frame 1f is constituted as a frame shape by side frames 10 disposed to be separated from side to side and extending in a vertical direction, an upper frame connecting the upper ends of the side frames 10 together, and a lower frame connecting the lower ends of the side frames 10 together. A cushion member is provided on the outer side of a head rest frame to constitute the head rest 3.

The side frames 10 are molded by a resin or metal. As shown in FIG. 4, each of the side frames 10 can be formed to have an L-shape or a U-shape in cross section. As will be described later, the air bag module (side air bag device) 20 is fixed to the side frame 10.

As shown in FIG. 4, the seat back 1 has a side support part 12 expanding in the travelling direction of the vehicle (forward of the vehicle) at its side (end part) in the vehicle width direction. Inside the side support part 12, the side air bag device 20 is accommodated in a gap in which a urethane pad 16 is not disposed. The side air bag device 20 has an air bag 34, 36 inflating and deploying to restrain an occupant and an inflator 30 supplying inflating gas to the air bag 34, 36. The air bag 34, 36 and the inflator (30) are disposed on the outer side of the side frame 10 in the vehicle width direction. The air bag 34, 36 is covered with a flexible cover 20a made of fabric. In the relationship between the main chamber 34 and the sub-chamber 36, the most appropriate compression method, such as folding (including also rolling) the air bag 34, 36 like an accordion or rolling the same, can be employed. In FIG. 4, symbol 25 indicates a door trim. Although not shown in the figure, the sub-chamber and the main chamber are integrally folded to overlap each other in a state of being flatly spread out so that their positional relationship during inflation and deployment is maintained in an accommodation state in which the air bag is folded. When the sub-chamber and the main chamber are separately folded, the folded sub-chamber part may be disposed at a position closer to the inflator than the folded main chamber part or may be disposed between the folded main chamber part and the side frame. That is, the folded sub-chamber may be disposed on a side closer to the occupant than the folded main chamber.

Seams 18, 22, and 24 of the skin of the seat back 1 are inweaved internally and connected together by sewing. Note that the forward seam 18 is torn when the air bag deploys.

The side support part 12 has a starting-point region 26 serving as a starting point when the side support part 12 is deflected to the occupant side by the inflation of the sub-chamber 36 (see FIG. 5 and FIGS. 6(A) and 6(B)). As the starting-point region 26, one of or a combination of a cut, a recessed part, and a thinned region can be used. The starting-point region 26 may be formed only on the part of the urethane 16 inside the side support part 12.

As shown in FIG. 5 and FIGS. 6(A) and 6(B), the air bag 34, 36 has the main chamber 34 deploying forward from the side support part 12 and the sub-chamber 36 deploying forward from between the main chamber 34 and the side support part 12. As shown in FIG. 4, the sub-chamber 36 deploys further toward the forward side than a vehicle forward edge 10a of the side frame part 10 to make at least a front part 14 of the side support part 12 protrude and deform toward the occupant side. Further, the sub-chamber 36 is disposed below the side support part 12 (see FIG. 5). The side support part 12 comes in contact with and pushes the lumbar region of the occupant when the sub-chamber 36 deploys. Pressing the lumbar region close to the center of gravity of an occupant's body contributes to an improvement in the performance of restraining the occupant at the early stage of the occurrence of an accident. A capacity of the sub-chamber 36 is configured to be smaller than that of the main chamber 34. Preferably, the shape and the capacity of the sub-chamber 36 may be so adjusted that the sub-chamber deploys only inside the side support part 12. In other words, the deploying sub-chamber 36 may be adjusted so as not to protrude from the front end of the cleaved side support part to the forward of the vehicle. Thus, the sub-chamber 36 is allowed to fully deploy at a rate faster than that of the main chamber, while a greater amount of the gas is allowed to fill in the main chamber 34. The main chamber 34 may be configured to deploy forward and to the outer side of the side support part 12. The configuration is made possible by a method of folding the air bag, an arrangement of the folded air bag, a setting of a gas jetting direction of the inflator, a flowing direction of the gas between the sub-chamber 36 and the main chamber 34, or the like. Thus, the disturbance of the deployment of the main chamber due to the deployment of the sub-chamber is reduced. As a result, the deployment of the main chamber is smoothened. Further, the cooperation between the deployment of the main chamber and the deployment of the sub-chamber contributes to an improvement in the performance of protecting the occupant.

As shown in FIGS. 6(A) and 6(B), the inflator 30 is accommodated inside the sub-chamber 36 in the embodiment. As the inflator 30, a cylinder-type inflator can be, for example, used. A pair of upper and lower stud bolts 32 protrudes from the outer peripheral part of the inflator 30 toward the inside in the vehicle width direction. The stud bolts 32 are attached (fixed by fastening) to the side frame 10 via a nut. The inflator 30 has a plurality of gas jetting ports arranged side by side in its circumferential direction. The gas is radially jetted from the gas jetting ports. Note that a diffuser for controlling the flow of the gas can be provided where necessary.

The inflator 30 is electrically connected to an air bag control ECU installed in the vehicle. The air bag control ECU is electrically connected to a satellite sensor for detecting a side collision. The inflator 30 can be configured to operate when the air bag control ECU detects a side collision based on a signal from the satellite sensor.

In the structure of the air bag 34, 36 shown in FIG. 6A, the peripheries 35a, 35b of an outside panel 34a and an inside panel 34b are sewed together to mold the bag-shaped main chamber 34. At the vehicle forward-end sewing spot 35*a*, the outside panel panel 34*a* and the inside panel 34*b* are sewed together. The forward edge of a panel 36*a* constituting the sub-chamber 36 is sewed to the inside panel 34*b* of the main chamber 34 at a sewing spot 35*c*, and the backward end of the panel 36*a* is sewed and connected to the panels 34*a* and 34*b* at the sewing spot 35*b*. The inside panel 34*b* of the main chamber 34 has a vent hole 38 via which the main chamber 34 and the sub-chamber 36 are in communication with each other. The inflating gas inside the sub-chamber 36 flows into the main chamber 34 via the vent hole 38. Since the sub-chamber 36 deploys prior to deployment of the main chamber 34 with the above structure, it becomes possible to quickly restrain the lateral movement of the occupant.

In the structure of the air bag 34, 36 shown in FIG. 6B, the peripheries 37*a*, 37*b* of the outside panel 34*a* and the inside panel 34*b* are sewed together to mold the bag-shaped main chamber 34. Similarly, the peripheries 37*d*, 37*b* of an outside panel 36*b* and the inside panel 36*b* are sewed together to mold the bag-shaped sub-chamber 36. At the forward sewing spot 37*a*, the forward edges of the panels 34*a* and 34*b* of the main chamber 34 are connected together by sewing. At the forward sewing spot 37*d*, the forward edges of the panels 36*a* and 36*b* of the sub-chamber 36 are connected together by sewing. The inside panel 34*b* of the main chamber 34 and the outside panel 36*b* of the sub-chamber 36 have a vent hole 39 via which the chambers 34, 36 are in communication with each other. The inflating gas inside the sub-chamber 36 flows into the main chamber 34 via the vent hole 39. The periphery of the vent hole 39 is sewed at the sewing spot 37*b*.

As shown in FIG. 7A, according to the first embodiment of the present invention with the above configuration, the sub-chamber 36 deploys inside the side support part 12 at the early stage of the operation of the air bag unit 20, and the tip end side of the side support part 12 is bent or deforms to protrude toward the inner side of the vehicle with the region 26 as a starting point while the seat skin is torn at the sewing part 18 to restrain the occupant so as to be pushed to the inside in the vehicle width direction. Note that the inflation of the main chamber 34 is not completed when the inflation of the sub-chamber 36 is completed. Since the sub-chamber 36 deploys further toward the forward side than the forward edge 10*a* of the side frame 10 and the front part 14 of the side support part 12 protrudes and deforms toward the occupant side, the generation of a force by which the occupant is pushed out from his/her back to a diagonally forward direction can be prevented or minimized. As a result, it becomes possible to prevent the occupant from moving in a direction in which a seat belt is pulled out. That is, restraining performance can be maximized while damage to the occupant is reduced.

Subsequently, as shown in FIG. 7B, when the air bag 34, 36 further inflates, the main chamber 34 fully deploys toward the forward side of the vehicle to protect the occupant during a collision.

Figure 8:
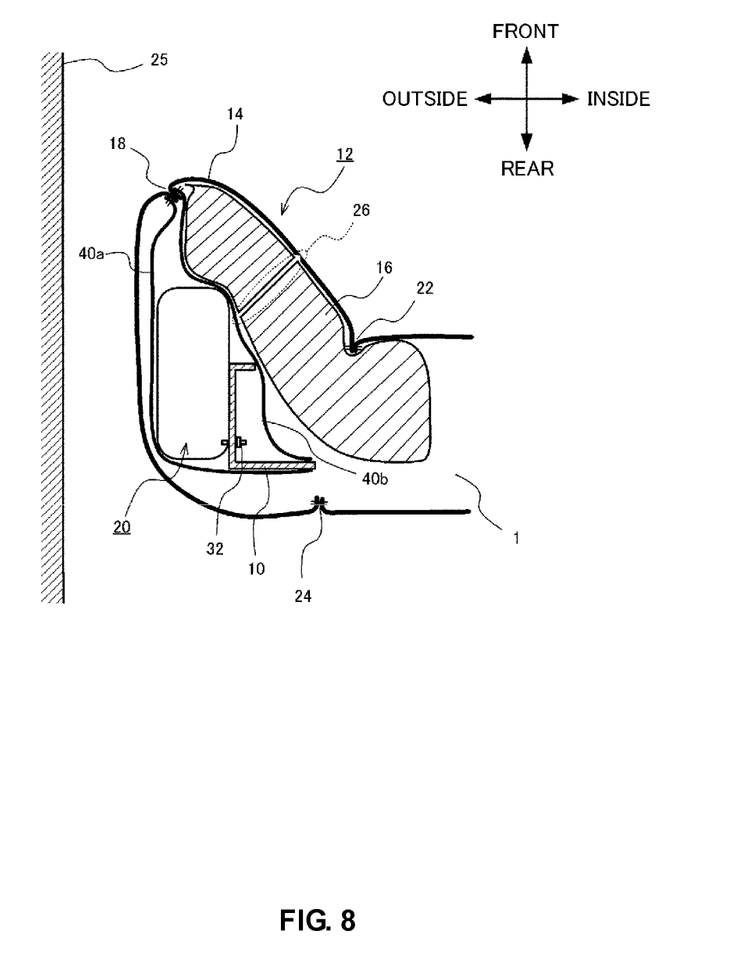
FIG. 8 is a cross-sectional view showing an occupant protection device according to a second embodiment of the present invention, and this figure corresponds to FIG. 4 in terms of directions, and moreover, illustration of the interior of a side air bag device is omitted for the convenience of explanation.
Figure 9:
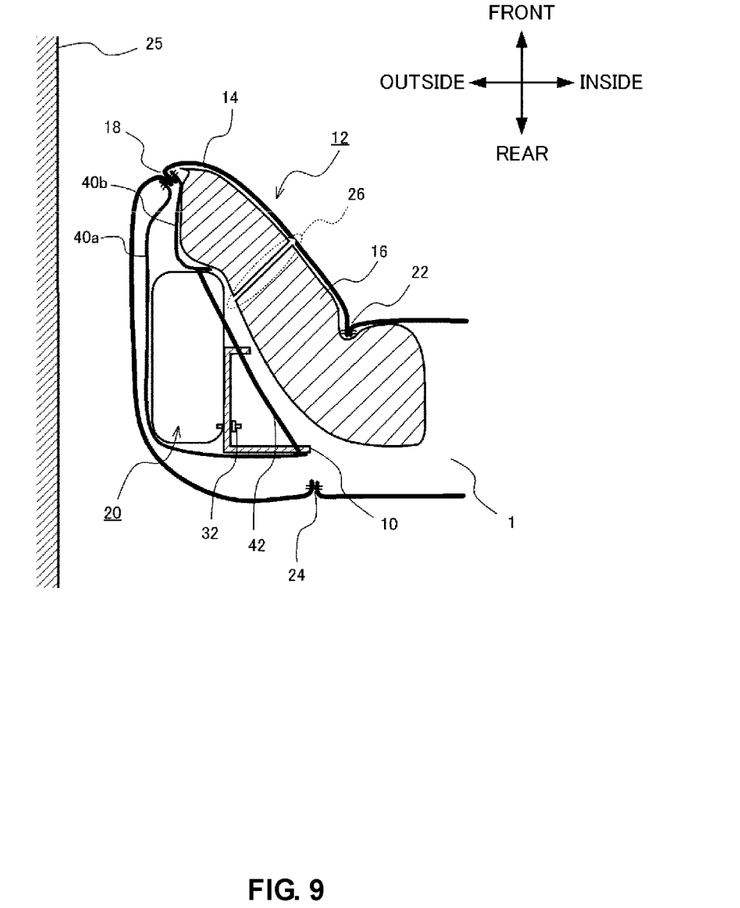
FIG. 9 is a cross-sectional view showing a modified example of the mode of FIG. 8.

FIG. 8 is a cross-sectional view showing an occupant protection device according to a second embodiment of the present invention in which directions correspond to the directions shown in FIG. 4. Note that the interior of an air bag unit 20 is omitted for the purpose of illustration. FIG. 9 is a cross-sectional view showing a modified example of the mode of FIG. 8.

The embodiment shown in FIG. 8 and FIG. 9 further has a stay cloth 40*a*, 40*b* covering at least a part of a main chamber 34 and a sub-chamber 36. The stay cloth 40*a*, 40*b* efficiently transmits energy generated when an air bag inflates and deploys to the urethane structure or the like of a seat to increase a deploying rate of the air bag and occupant protection performance with the acceleration to tear the seat itself, and is constituted by a first stay cloth 40*a* positioned on the vehicle outer side of the side air bag and a second stay cloth 40*b* positioned on the vehicle inner side of the side air bag. The front-end part of the stay cloth 40*a*, 40*b* is connected to the vicinity of a seam 18 of the seat at the forward part of a seat back, and the back-end part of the stay cloth 40*a*, 40*b* is connected to the backward part of the air bag of a seat frame 10.

The stay cloths 40*a* and 40*b* preferably have a fragile part serving as a starting point to tear when the sub-chamber 36 deploys. The fragile part is generally provided in the vicinity of a torn part of the seat. However, the fragile part is preferably provided at a position at which the remaining stay cloth does not form an obstacle when the main bag inflates and deploys and protrudes to the forward of the vehicle. The sub-chamber 36 preferably has a relatively small capacity and a short deployment time to deploy only inside a side support part 12. Thus, when the stay cloths 40*a* and 40*b* are caused to operate by the deployment of the sub-chamber 36, the main chamber 34 can be urged to smoothly deploy. That is, by the operation of the stay cloths 40*a* and 40*b*, the energy generated when the air bag inflates and deploys is efficiently transmitted to the urethane part of the seat and the seat is quickly cleaved, whereby the main chamber 34 inflates and protrudes from the cleaved part to be able to quickly deploy to the outer side of the side support part 12.

As shown in FIG. 9, one of the two stay cloths, here, the second stay cloth 40*b* may be shortened, and its backward part may be connected to a wire 42. The vehicle backward part of the first stay cloth 40*a* and the vehicle backward part of the wire 42 connected to the vehicle backward part of the second stay cloth 40*b* may be connected to the backward part of the seat frame 10. For the connection between the stay cloths 40*a* and 40*b* and the wire 42, reinforcing parts (overlapped cloths) capable of retaining the wire are provided at the ends of the stay cloths 40*a* and 40*b*, and the wire 42 is fixed by means of a stapler or the like. Alternatively, ring fittings or the like for the passage of the wire may be provided at the ends of the stay cloths 40*a* and 40*b* to make the wire 42 pass through the ring fittings. One or a plurality of the wires 42 is provided. In the case of the plurality of wires 42, the wires 42 may or may not be provided in parallel. Where necessary, the wires 42 may be provided reticulately.

The stay cloths 40*a* and 40*b* themselves are used to assist to tear a skin of the side support part 12 when the air bag 34, 36 deploys, and the wire 42 is used to enhance the effect of assisting the tearing. Since the wire 42 hardly extends, a tensile force applied to the stay cloths 40*a* and 40*b* when the air bag deploys can be increased by the wire 42 and the tearing of the seat skin can be completed at an earlier timing during the deployment. Thus, a timing at which an occupant is moved in a lateral direction by the sub-chamber 36 can be made earlier, and the effect of restraining the occupant during the full deployment of the main chamber 34 can be further enhanced. Other than the above example, the wire may be provided at the first stay cloth 40*a*, or the wires may be provided at both the first stay cloth and the second stay cloth 40*b*. Further, a shape of the stay cloths 40*a*, 40*b* themselves is preferably a wide band shape but may be formed to cover a greater and wider area as much as possible so long as it is economically allowed. The stay cloths are preferably provided at a position including a central part in the vertical direction of the accommodated air bag.

Figure 10:
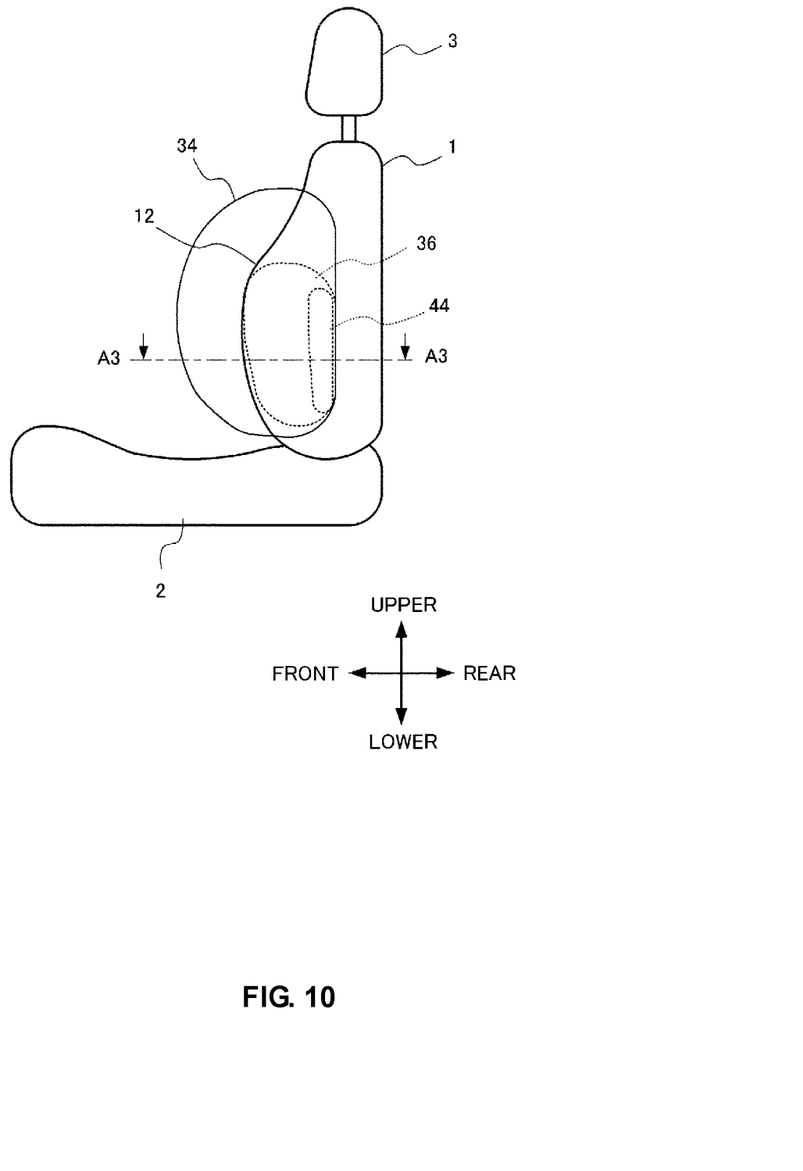
FIG. 10 is a schematic side view of an occupant protection device according to a third embodiment of the present invention and shows a state where an air bag deploys observed from an outside in a vehicle width direction is shown.
Figure 11:
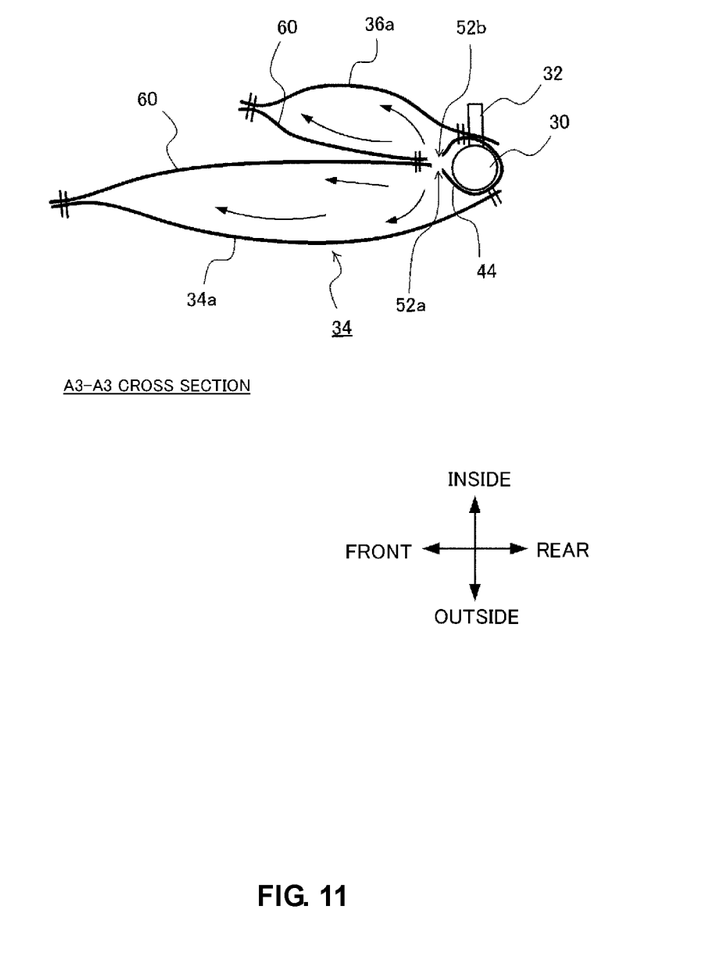
FIG. 11 is a schematic view showing the deploying air bag corresponding to a cross section in the A3-A3 direction of FIG. 10.

FIG. 10 is a schematic side view of an occupant protection device according to a third embodiment of the present invention and shows a state where an air bag deploys is observed from an outside in a vehicle width direction is shown. FIG. 11 is a schematic view showing the deploying air bag corresponding to a cross section in the A3-A3 direction of FIG. 10. In the embodiment, an intermediate chamber 44 is connected between a main chamber 34 and a sub-chamber 36, and an inflator 30 is accommodated inside the intermediate chamber 44. As shown in FIG. 11, an intermediate panel 60 is disposed so as to enclose the inflator 30, and the main chamber 34 is molded by the outer surface of the intermediate panel 60 and an outside panel 34a. Further, the sub-chamber 36 is molded by the inner surface of the intermediate panel 60 and an inside panel 36a.

Further, a first vent hole 52a is formed at the boundary between the main chamber 34 and the intermediate chamber 44, and a second vent hole 52b is formed at the boundary between the sub-chamber 36 and the intermediate chamber 44. Further, configuration is made such that inflating gas inside the intermediate chamber 44 is distributed to the main chamber 34 and the sub-chamber 36 via the first and second vent holes 52a and 52b. The second vent hole 52b is made greater in size than the first vent hole 52a, whereby it becomes possible to accelerate the deployment of the sub-chamber 36. Meanwhile, even if the first vent hole 52a and the second vent hole 52b are the same in size, the sub-chamber 36 fully deploys at a rate faster than the main chamber 34 due to its small capacity. Accordingly, by the adjustment of a size, a shape, a position, or the like of a vent hole according to the characteristics of a vehicle or a seat, it becomes also possible to set the optimum inflation and deployment timings of a main chamber and a sub-chamber.

When the intermediate chamber 44 is provided and the vent holes 52a and 52b different from each other are formed on the main chamber 34 and the sub-chamber 36, respectively, as in the embodiment, it becomes possible to easily and carefully control the deployment timings of the main chamber 34 and the sub-chamber 36.

The present invention is described in association with the above exemplary embodiments, but it is apparent that persons skilled in the art could make abundant equivalent modifications and deformations according to the present disclosure. Accordingly, it is assumed that the above exemplary embodiments of the present invention are illustrative but are not limitative. The described embodiments could be modified in various ways without departing from the spirit and the scope of the present invention. For example, emphasis is laid on a side air bag on a near side in the above "Description of Embodiments," but it is also possible to apply the present invention to an air bag on a far side (in the surface of a vehicle seat on a side far from a vehicle door), a vehicle having a single seat such as a ultra small vehicle like a small mobility (vehicle having only one seat in a row regardless of the presence or absence of a door), or the like.

While the above description constitutes the preferred embodiment of the present invention, it will be appreciated that the invention is susceptible to modification, variation and change without departing from the proper scope and fair meaning of the accompanying claims.

The invention claimed is:

1. An occupant protection device for protecting an occupant of a vehicle seat having a seat cushion forming a seat surface and a seat back forming a back rest, and a side air bag device accommodated in the vehicle seat, comprising,
   the seat back has a side support part bulging in a vehicle travelling direction at a side part thereof in a vehicle width direction,
   a seat frame forming a framework of the seat,
   the side air bag device has an air bag inflating and deploying to restrain the occupant and an inflator for supplying an inflating gas to the air bag,
   a side frame part constituting a part of the seat frame disposed inside the side support part,
   the side air bag device is accommodated on an outer side of the side frame part in the vehicle width direction,
   the air bag has a main chamber deploying forward from the side support part and a sub-chamber deploying forward from between the main chamber and the side support part, and
   the sub-chamber deploys further toward a forward side than a vehicle forward edge of the side frame thereby making at least a front part of the side support part protrude and deform toward an occupant side during the inflating and deploying of the airbag, and wherein the sub-chamber deploys only inside the side support part.

2. An occupant protection device for protecting an occupant of a vehicle seat having a seat cushion forming a seat surface and a seat back forming a back rest, and a side air bag device accommodated in the vehicle seat, comprising,
   the seat back has a side support part bulging in a vehicle travelling direction at a side part thereof in a vehicle width direction,
   a seat frame forming a framework of the seat,
   the side air bag device has an air bag inflating and deploying to restrain the occupant and an inflator for supplying inflating gas to the air bag,
   a side frame part constituting a part of the seat frame is disposed inside the side support part,
   the side air bag device is accommodated on an outer side of the side frame part in the vehicle width direction,
   the air bag has a main chamber deploying forward from the side support part and a sub-chamber deploying forward from between the main chamber and the side support part, and
   the sub-chamber deploys further toward a forward side than a vehicle forward edge of the side frame thereby making at least a front part of the side support part protrude and deform toward an occupant side during the inflating and deploying of the airbag,
   the main chamber and the sub-chamber are provided to be separated from each other,
   an intermediate chamber is connected between the main chamber and the sub-chamber,
   the inflator is accommodated inside the intermediate chamber,
   a first vent hole is formed at a boundary between the main chamber and the intermediate chamber to connect an internal space of the main chamber and an internal space of the intermediate chamber together,
   a second vent hole is formed at a boundary between the sub-chamber and the intermediate chamber to connect an internal space of the sub-chamber and the internal space of the intermediate chamber together, and
   the inflating gas inside the intermediate chamber is distributed to the sub-chamber and the main chamber via the first vent hole and the second vent hole, and the second vent hole is greater in size than the first vent hole.

3. The occupant protection device according to claim 2, further comprising, the sub-chamber deploys only inside the side support part.

4. The occupant protection device according to claim 1, further comprising, the main chamber deploys forward and to the outer side of the side support part.

5. The occupant protection device according to claim 1, further comprising, the inflator is accommodated inside the sub-chamber.

6. The occupant protection device according to claim 5, further comprising,
the main chamber and the sub-chamber are provided to be separated from each other,
an internal space of the main chamber and an internal space of the sub-chamber are connected together via a vent hole, and
the inflating gas inside the sub-chamber flows into the main chamber via the vent hole.

7. The occupant protection device according to claim 1, further comprising,
the main chamber and the sub-chamber are provided to be separated from each other,
an intermediate chamber is connected between the main chamber and the sub-chamber,
the inflator is accommodated inside the intermediate chamber,
a first vent hole is formed at a boundary between the main chamber and the intermediate chamber to connect an internal space of the main chamber and an internal space of the intermediate chamber together,
a second vent hole is formed at a boundary between the sub-chamber and the intermediate chamber to connect an internal space of the sub-chamber and the internal space of the intermediate chamber together, and
the inflating gas inside the intermediate chamber is distributed to the sub-chamber and the main chamber via the first vent hole and the second vent hole.

8. The occupant protection device according to claim 1, further comprising, the sub-chamber deploys prior to deployment of the main chamber.

9. The occupant protection device according to claim 1, further comprising, the sub-chamber is disposed on a side closer to the occupant than the main chamber.

10. The occupant protection device according to claim 1 further comprising, the side support part has a starting-point region serving as a starting point when the side support part is bent to the occupant side by inflation of the sub-chamber.

11. The occupant protection device according to claim 10, further comprising, the starting-point region is one of or a combination of a cut, a recessed part, and a thinned region.

12. An occupant protection device for protecting an occupant of a vehicle seat having a seat cushion forming a seat surface and a seat back forming a back rest, and a side air bag device accommodated in the vehicle seat, comprising, the seat back has a side support part bulging in a vehicle travelling direction at a side part thereof in a vehicle width direction,
a seat frame forming a framework of the seat,
the side air bag device has an air bag inflating and deploying to restrain the occupant and an inflator for supplying inflating gas to the air bag,
a side frame part constituting a part of the seat frame is disposed inside the side support part,
the side air bag device is accommodated on an outer side of the side frame part in the vehicle width direction,
the air bag has a main chamber deploying forward from the side support part and a sub-chamber deploying forward from between the main chamber and the side support part, and
the sub-chamber deploys further toward a forward side than a vehicle forward edge of the side frame thereby making at least a front part of the side support part protrude and deform toward an occupant side during the inflating and deploying of the airbag, and
the sub-chamber is disposed below the side support part so that a lumbar region of the occupant is pushed by the side support part when the sub-chamber deploys.

13. The occupant protection device according to claim 1, further comprising, a stay cloth covering at least a part of the main chamber and the sub-chamber.

14. The occupant protection device according to claim 13, further comprising, the stay cloth has a fragile part serving as a starting point to tear when the sub-chamber deploys.

15. The occupant protection device according to claim 13, further comprising, the stay cloth includes a first stay cloth positioned on a vehicle outer side of the side air bag and a second stay cloth positioned on a vehicle inner side of the side air bag.

16. The occupant protection device according to claim 15, further comprising, a wire connecting a vehicle backward part of the first stay cloth and a vehicle backward part of the second stay cloth together.

17. A side air bag device installed in the occupant protection device according to claim 1.

18. The occupant protection device according to claim 1, further comprising, an inflation capacity of the sub-chamber is less than an inflation capacity of the main chamber.

19. The occupant protection device according to claim 1, further comprising, wherein the sub-chamber is configured to fully deploy at a rate faster than a rate of deployment of the main chamber.

20. The occupant protection device according to claim 1, further comprising, wherein upon deployment of the airbag, a forward edge of the main chamber extends further forward in the vehicle traveling direction than a forward edge of the sub-chamber.

* * * * *